United States Patent
Le Meaux

(10) Patent No.: US 11,974,581 B2
(45) Date of Patent: May 7, 2024

(54) FINGER HOLDER FOR A POULTRY PLUCKER

(71) Applicant: PLUMATECH, Plaintel (FR)

(72) Inventor: Franck Le Meaux, Plaintel (FR)

(73) Assignee: PLUMATECH, Plaintel (FR)

( * ) Notice: Subject to any disclaimer, the term of this patent is extended or adjusted under 35 U.S.C. 154(b) by 170 days.

(21) Appl. No.: 17/836,535

(22) Filed: Jun. 9, 2022

(65) Prior Publication Data
US 2022/0394984 A1    Dec. 15, 2022

(30) Foreign Application Priority Data

Jun. 10, 2021    (FR) ...................................... 2106112

(51) Int. Cl.
    *A22C 21/00*      (2006.01)
    *A22C 21/02*      (2006.01)

(52) U.S. Cl.
    CPC ................. *A22C 21/022* (2013.01)

(58) Field of Classification Search
    CPC .................................................. A22C 21/022
    USPC ......................................................... 452/87
    See application file for complete search history.

(56) References Cited

U.S. PATENT DOCUMENTS

| | | | |
|---|---|---|---|
| 7,066,805 B2* | 6/2006 | Turner | A22C 21/022 452/88 |
| 7,905,769 B1* | 3/2011 | Harrison, Jr. | A63F 9/24 434/3 |
| 9,433,225 B2* | 9/2016 | Servaas | A22C 21/022 |

FOREIGN PATENT DOCUMENTS

FR      2019911 A1    7/1970

OTHER PUBLICATIONS

Mar. 11, 2022 Search Report issued in French Patent Application No. 2106112.

\* cited by examiner

*Primary Examiner* — Richard T Price, Jr.
(74) *Attorney, Agent, or Firm* — Williams Mullen; R. Brian Drozd

(57) ABSTRACT

A finger holder for a plucker, being intended to be set in rotation about an axis of rotation and having a mounting plate having fastening means intended for fastening the mounting plate to a shaft of the plucker, a cover which caps a frontal face of the mounting plate and has a plurality of bores, wherein each bore is intended to receive a finger of the plucker, and a locking system which is separate from the fastening means and takes up either a locking position, in which it locks the cover on the mounting plate, or an unlocking position, in which it does not lock the cover on the mounting plate.

8 Claims, 5 Drawing Sheets

[Fig. 1]
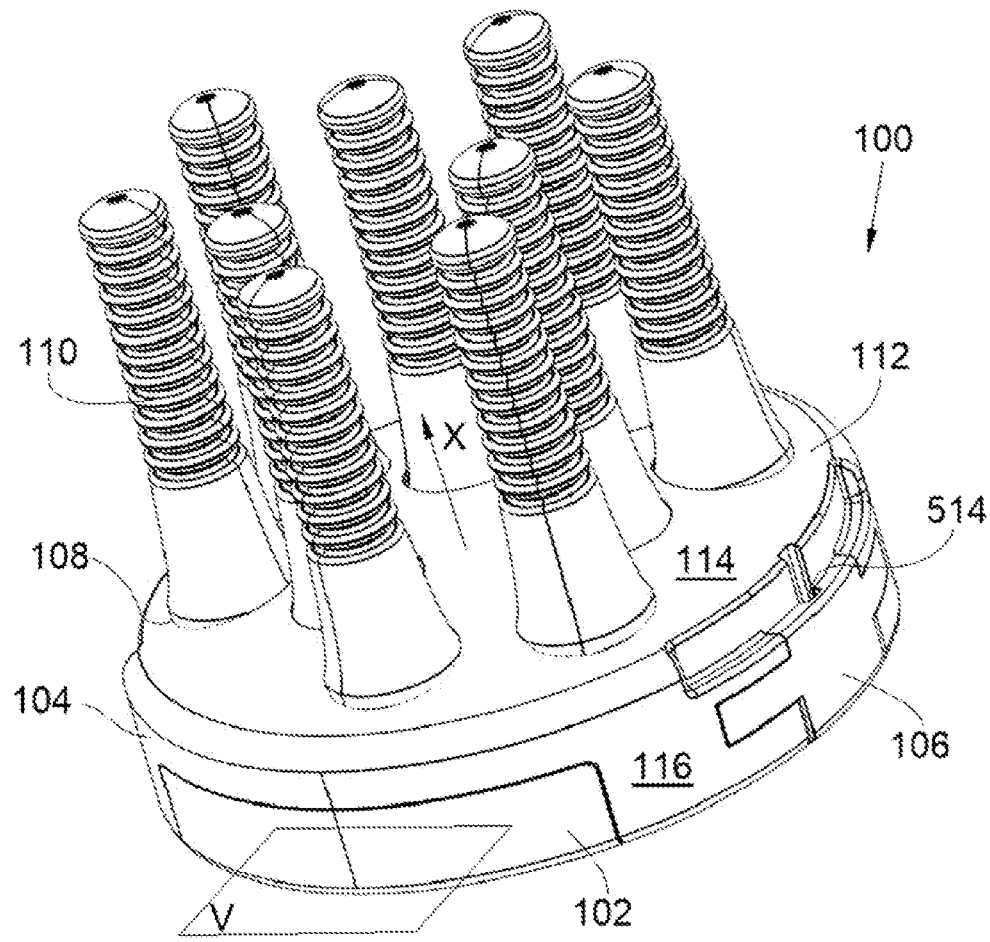
[Fig. 2]
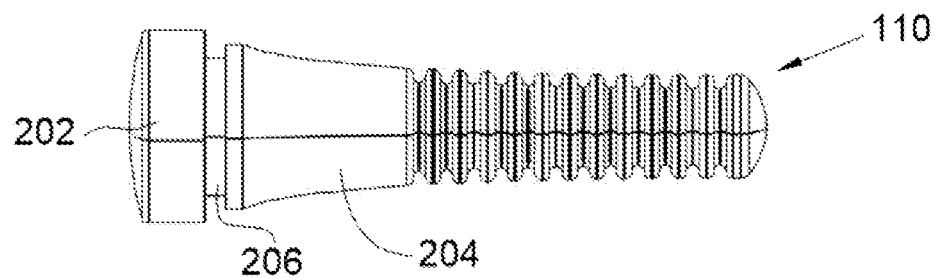

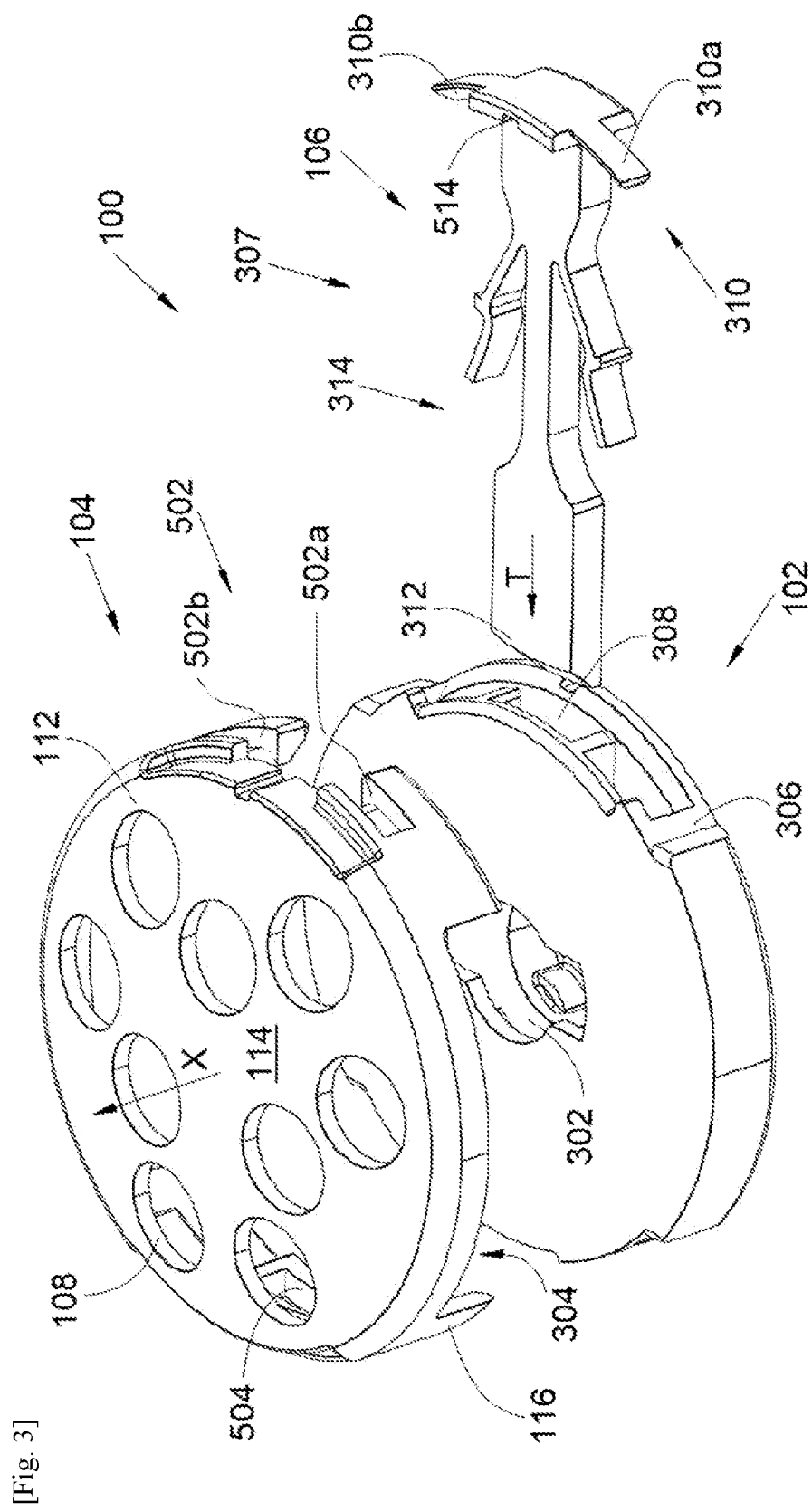
[Fig. 3]

[Fig. 4]
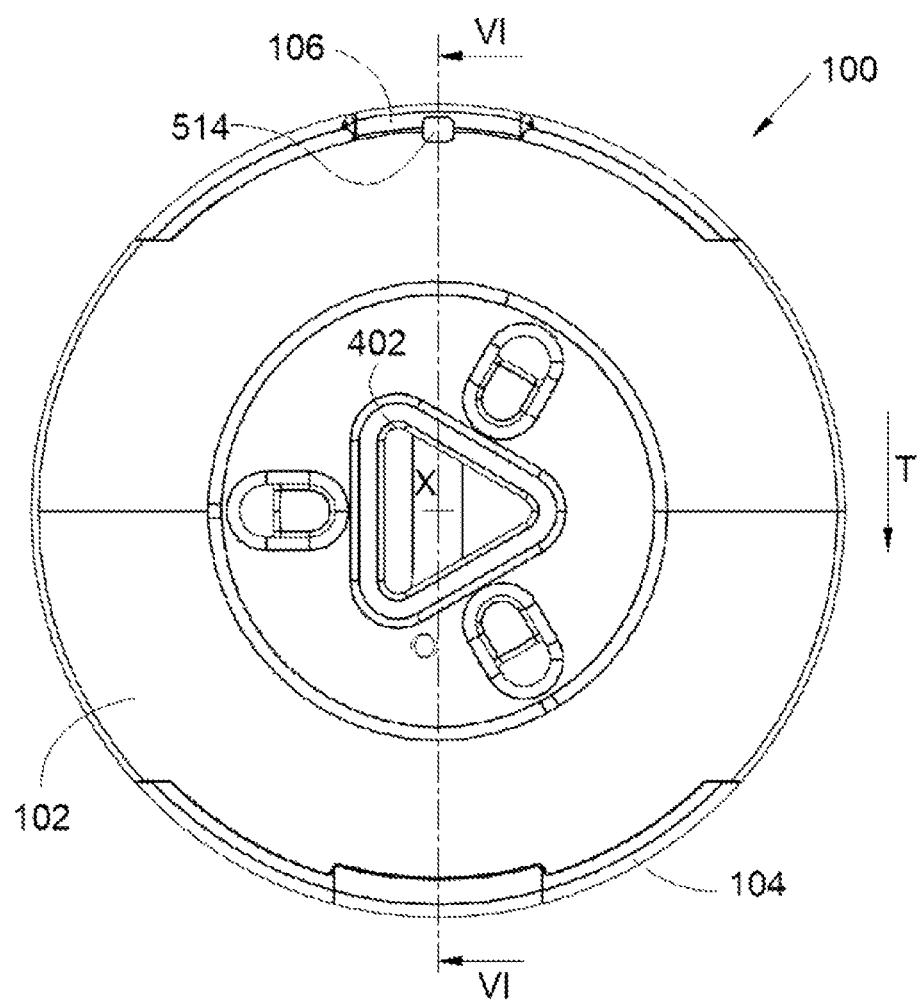

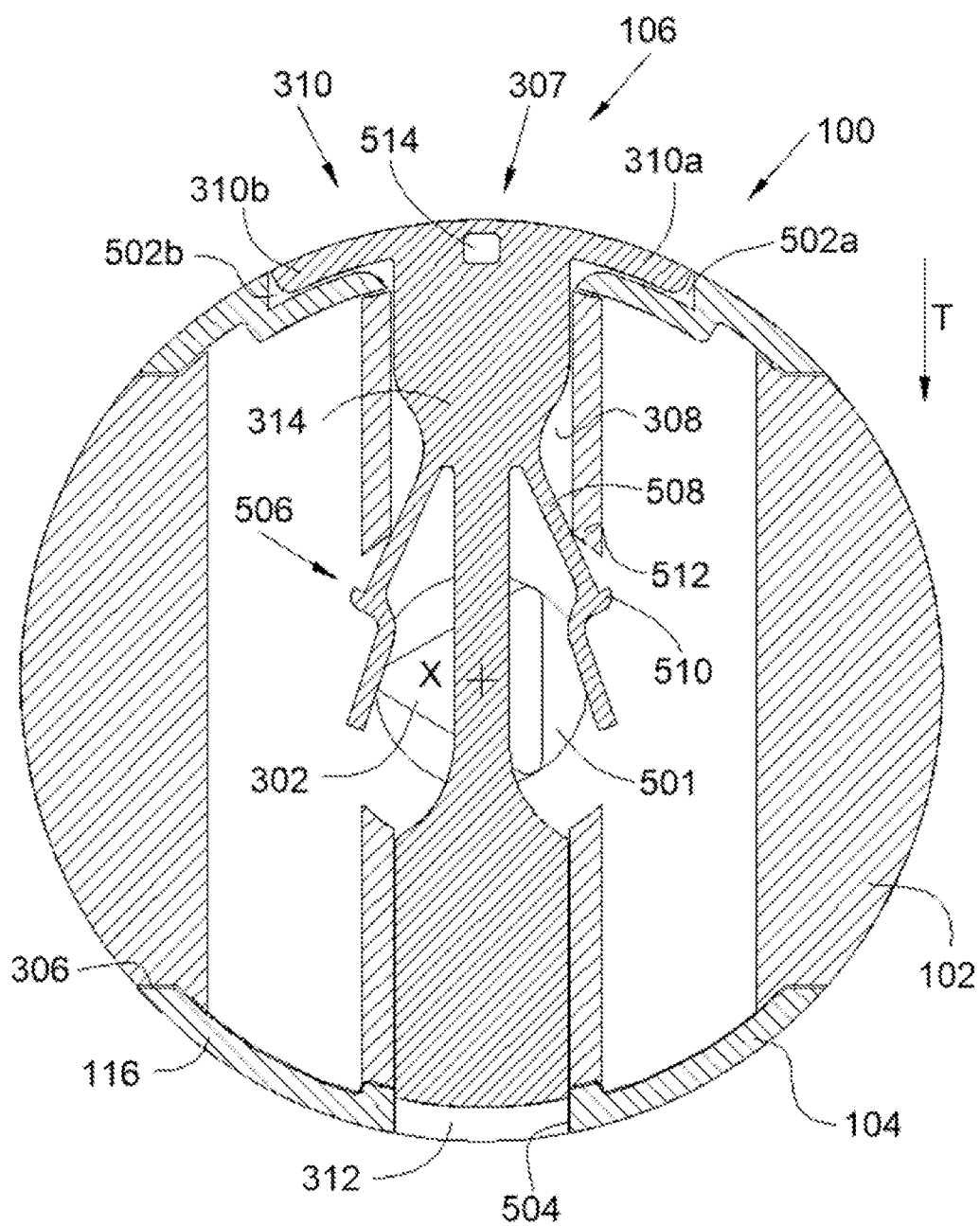
[Fig. 5]

[Fig. 6]
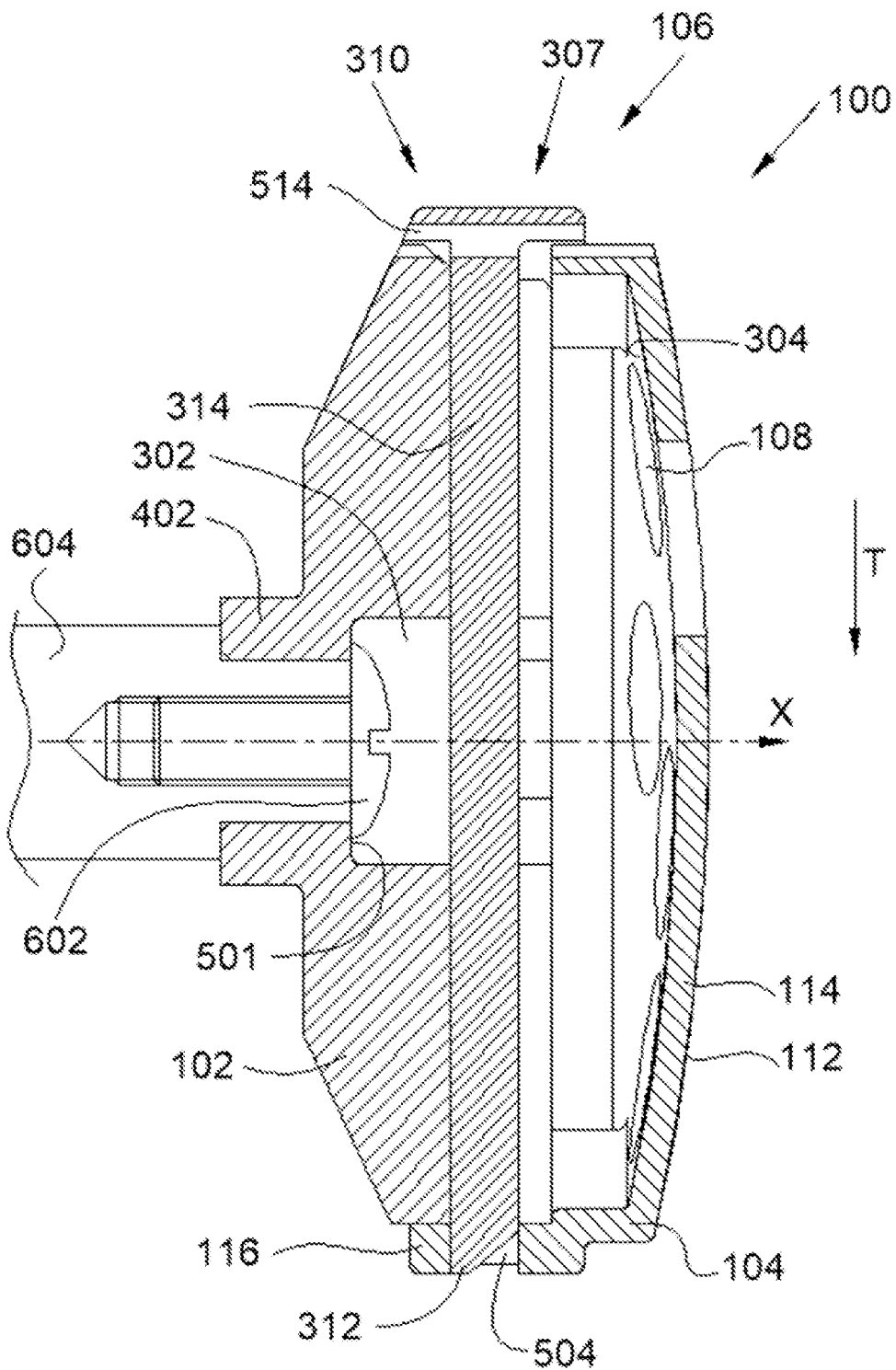

FINGER HOLDER FOR A POULTRY PLUCKER

TECHNICAL FIELD

The present invention relates to a finger holder for a poultry plucker, and to a poultry plucker having at least one such finger holder.

PRIOR ART

In order to pluck a poultry bird, it is known practice to use a plucker. A plucker is a machine which has a plurality of finger holders and each finger holder is provided with a plurality of fingers. Each finger is conventionally made of a flexible material and have different shapes. For each finger holder, the plucker has a shaft to which the finger holder is fastened. By virtue of a motorization system, each shaft is driven in rotation, and the contact between the poultry bird and the rotating fingers pulls the feathers out of the bird.

Currently, a finger holder takes the form of a circular mounting plate through which a plurality of bores pass and which has, at the centre, an impression, the shape of which corresponds to the shape of the shaft in order for the mounting plate to be fitted on the shaft. The mounting plate is then fastened to the shaft by a screw.

When a finger has become worn, it is necessary to replace it. In the context of finger holders that are currently used, it is necessary to remove the finger holder from its shaft, to take off the worn finger, to fit a new finger and to reattach the mounting plate. The removal and reattachment of the mounting plate are relatively long operations during which the plucker is not in operation.

Moreover, the opposite face of the mounting plate from the fingers has numerous crevices, in particular on account of the bores, in which debris can get stuck and the cleaning of which then also requires each mounting plate to be removed.

It is therefore necessary to find an arrangement which allows a time saving, in particular in order to replace the worn fingers.

SUMMARY OF THE INVENTION

It is an object of the invention to provide a finger holder for a plucker, wherein the finger holder has a mounting plate and a cover which bears the fingers and is fastened removably to the mounting plate.

To this end, a finger holder for a plucker is provided, said finger holder being intended to be set in rotation about an axis of rotation and having:
- a mounting plate having fastening means intended for fastening the mounting plate to a shaft of the plucker,
- a cover which caps a frontal face of the mounting plate and has a plurality of bores, wherein each bore is intended to receive a finger of the plucker, and
- a locking system which is separate from the fastening means and takes up either a locking position, in which it locks the cover on the mounting plate, or an unlocking position, in which it does not lock the cover on the mounting plate, wherein the cover has a cap which covers the frontal face of the mounting plate and tabs extending perpendicularly to the cap, and wherein the mounting plate has, for each tab, a recess in which said tab is accommodated.

Advantageously, the locking system is a slide which slides in a direction of movement in order to pass from the unlocking position to the locking position, the mounting plate has a tunnel that passes through it and extends perpendicularly to the axis of rotation, the cover has two housings, each housing is disposed at one of the ends of the tunnel, and in the locking position, the first end is accommodated in the first housing, the second end is accommodated in the second recess and the central part is accommodated in the tunnel.

Advantageously, each housing is incorporated into a tab.

Advantageously, the first housing is made up of two peripheral slots made in a first tab, for each peripheral slot, the first end of the slide has a rib which is accommodated in said peripheral slot, and the second housing is formed of a window made in a second tab.

Advantageously, the finger holder has a disengageable immobilizing system which immobilizes the slide with respect to the mounting plate in the locking position.

Advantageously, the immobilizing system has:
- two flexible arms with a first end and a second end, wherein the first end is integral with the slide, wherein the second end extends in the direction of movement starting from the first end, and the two second ends extend away from one another starting from the first ends and following the direction of movement,
- for each arm, a stop integral with the mounting plate, wherein in the locking position, each second end is constrained against a stop, and
- a pulling means provided to allow the slide to be pulled in an opposite direction to the direction of movement.

Advantageously, each second end bears a hook integral with the second end, and in the unlocking position, each hook comes into abutment against the stop associated with said second end.

The invention also provides a poultry plucker having at least one shaft, a motorization system driving each shaft in rotation, for each shaft, a finger holder according to one of the preceding variants, wherein the mounting plate is fastened to said shaft by the fastening means, and for each bore, a finger inserted into said bore.

BRIEF DESCRIPTION OF THE DRAWINGS

The features of the invention that are mentioned above, and others, will become more clearly apparent from reading the following description of an exemplary embodiment, said description being given in relation to the appended drawings, in which:

FIG. 1 is a perspective view of a finger holder according to the invention,

FIG. 2 is a side view of a finger according to one exemplary embodiment,

FIG. 3 is an exploded view of the finger holder according to the invention,

FIG. 4 is a rear view of the finger holder according to the invention,

FIG. 5 is a view in cross section on the plane V in FIG. 1 of the finger holder according to the invention, and FIG. 6 is a view in cross section on the plane VI in FIG. 4.

DETAILED DESCRIPTION OF EMBODIMENTS

FIG. 1 shows a finger holder 100 according to the invention for a poultry plucker.

The finger holder 100 has a mounting plate 102, a cover 104 and a locking system 106.

FIG. 3 shows an exploded view of the finger holder 100 and FIG. 4 shows a rear view of the finger holder 100.

In use, the mounting plate 102 is fastened to a shaft of the plucker by virtue of fastening means of the mounting plate 102, and the shaft is driven in rotation about its axis by a motorization system. The mounting plate 102 is thus driven in rotation about an axis of rotation X corresponding to the axis of the shaft following assembly.

In the embodiment of the invention presented here, in order to prevent the mounting plate 102 from rotating relative to the shaft, the mounting plate 102 has, on a rear face, a sleeve 402, the interior recessed shape of which, which is triangular in this case, is complementary to the shape of the shaft. Thus, the sleeve 402 fits over the shaft and the complementary of the interior shape of the sleeve 402 and the exterior shape of the shaft prevents the mounting plate 102 from rotating relative to the shaft.

As is shown more particularly in FIG. 6, in order to ensure that the mounting plate 102 is secured to the shaft 604 of the plucker, the mounting plate 102 has a well 302 which passes through the mounting plate 102 parallel to the axis of rotation X and continues the interior recessed shape of the sleeve 402, allowing a screw 602 to be fitted, which is screwed onto the end of the shaft 604 that is accommodated in the sleeve 402 and the head of which comes to bear against a shoulder 501 of the well 302. Of course, other securing means are possible between the shaft 604 and the mounting plate 102.

Thus, in the embodiment of the invention presented here, the fastening means comprise immobilizing means which prevent the mounting plate 102 from rotating relative to the shaft and securing means which fasten the mounting plate 102 to the shaft 604. In this case, the immobilizing means are made up of the sleeve 402 and the securing means are made up of the well 302, the shoulder 501 and the screw 602.

The cover 104 caps a frontal face of the mounting plate 102 and has a plurality of bores 108, wherein each bore 108 receives a finger 110.

The frontal face of the mounting plate 102 is the opposite face to the rear face and in this case it is perpendicular to the axis of rotation X. The frontal face is the face from which the fingers 110 will extend.

The cover has an interior face 304 oriented towards the frontal face of the mounting plate 102 and an exterior face 112 oriented in the opposite direction. The frontal face of the mounting plate 102 is thus covered by the cover 104.

FIG. 2 shows an example of a finger 110 which has a circular groove 206 which separates the finger 110 into a pad 202 and a stem 204. The finger 10 is made of a flexible material and the fitting of the finger 110 consists in introducing the free end of the stem 204 into the bore 108 from the interior face 304 until the edges of the bore 108 are force-fitted in the circular groove 206. The pad 202 is then located on the side of the interior face 304 and the stem 204 is located on the side of the exterior face 112.

The locking system 106 takes up either a locking position, in which it locks the cover 104 on the mounting plate 102, or an unlocking position, in which it does not lock the cover 104 on the mounting plate 102 and the cover 104 can then be separated from the mounting plate 102.

Thus, when a finger 110 needs to be changed, all that is necessary is to move the locking system 106 into the unlocking position in order to release the cover 104, remove the finger 110 from the cover 104, fit a new finger 110 on the cover 104, and then reposition the cover 104 on the mounting plate 102 and move the locking system 106 into the locking position. All these operations are carried out while leaving the mounting plate 102 fastened to the shaft, thereby simplifying the technician's work. Thus, in the invention described here, the fastening means and the locking system 106 are separate and independent elements.

Moreover, by creating a mounting plate 102 in one moulded piece without irregularities and without holes for receiving the fingers 110, the rear face, which in this case bears the sleeve 402, can be smooth in order to avoid deposits of debris, thereby making it easier to clean the rear of the finger holder 100.

To limit the risks of the cover 104 rotating relative to the mounting plate 102, the cover 104 has a cap 114 which covers the frontal face of the mounting plate 102 and tabs 116 that are integral with the cap 114 and extend generally perpendicularly to the cap, that is to say parallel to the axis of rotation X, in order to form a skirt around the cap 114.

The mounting plate 102 then comprises, for each tab 116, a recess 306 in which said tab 116 is accommodated.

The tabs 116 are in this case on the perimeter of the cap 114 and the recesses 306 consist of reductions in the diameter of the mounting plate 102.

FIGS. 5 and 6 show cross sections through the finger holder 100.

In the embodiment of the invention presented here, the locking system 106 is in the form of a slide 307.

The mounting plate 102 has a tunnel 308 which passes through it, which extends perpendicularly to the axis of rotation X and in which the slide slides 307.

The cover 104 has two housings 502 and 504 and each housing 502, 504 is disposed at one of the ends of the tunnel 308.

The slide 307 has a first end 310, a second end 312 and a central part 314 between the first end 310 and the second end 312.

Thus, when the slide 307 is put into the locking position, the first end 310 is accommodated in the first housing 502, the second end 312 is accommodated in the second recess 504 and the central part 314 is accommodated in the tunnel 308, thereby ensuring that the cover 104 is locked on the mounting plate 102.

The movement of the slide 307 between the locking position and the unlocking position is thus a movement in translation perpendicularly to the axis of rotation X.

The housings 502 and 504 are in this case diametrically opposite one another with respect to the axis of rotation X.

In the embodiment of the invention presented here, each housing 502, 504 is incorporated into a tab 116.

The first housing 502 is in this case formed of two peripheral slots 502a-b which have been made in a first tab 116 and between which the slide 307 passes, and for each peripheral slot 502a-b, the first end 310 of the slide 307 has a rib 310a-b which is accommodated in said peripheral slot 502a-b.

The second housing 504 is in this case formed of a window which has been made in a second tab 116 and into which the second end 312 of the slide 307 passes.

In the embodiment of the invention present in FIG. 5, the passage from the unlocking position to the locking position is a movement in translation in a direction of movement T that extends here from the first housing 502 to the second housing 504. Conversely, the passage from the locking position to the unlocking position is a movement in translation in an opposite direction to the direction of movement T.

To ensure that the slide 307 is prevented from moving in translation when it is in the locking position and thus to prevent undesired movement of said slide 307 towards the unlocking position, the finger holder 100 has an immobilizing system 506 which immobilizes the slide 307 with respect to the mounting plate 102 and which is disengageable to allow the movement towards the unlocking position.

In the embodiment of the invention presented here, the immobilizing system 506 has two flexible arms 508 with a first end and a second end, wherein the first end is integral with the slide 307, and more particularly in this case with the central part 314, and, for each arm 508, a stop 512 which is integral with the mounting plate 102 and with which the second end of the arm 508 cooperates in order to immobilize the slide 307 in the locking position.

In the embodiment of the invention depicted in FIG. 5, each stop 512 is formed by one end of a wall of the tunnel 308.

For each arm 508, the second end extends in the direction of movement T starting from the first end, and the two second ends extend away from one another starting from the first ends and following the direction of movement T.

In the rest position of the arms 508, the spacing between the two second ends is greater than the spacing between the two stops 512. On moving apart, each arm 504 comes to bear against one of the stops 512, thereby bringing about friction which stops the slide 307 in the absence of sufficient force being applied to the slide 307. Thus, in the locking position, each second end is constrained against a stop 512.

To allow the passage from the locking position to the unlocking position, the immobilizing system 506 also has a pulling means 514 which allows a technician to pull the slide 307 in an opposite direction to the direction of movement T in order to pass it from the locking position to the unlocking position. Thus, by pulling on the slide 307, the technician forces the two second end to move towards one another and forces the slide 307 to move towards the unlocking position with the ribs 310a-b coming out of the peripheral slots 502a-b and the second end 312 coming out of the second recess 504, making it possible to remove the cover 104.

The pulling means 514 is in this case a cavity into which a tool, such as a screwdriver, can be introduced, but it is also possible to provide a handle that can be grasped directly by the technician.

The prevent the loss of the slide 307, when it is in the unlocking position, each second end bears a hook 510 which is integral with the second end and, in the unlocking position, comes into abutment against the stop 512 associated with said second end and prevents the slide 307 from being removed completely.

To remove the slide 307 completely, all the technician needs to do is to pinch the two arms 508 in order to release the hooks 510.

In the embodiment of the invention presented in the figures, the mounting plate 102 and the cover 104 are each generally in the form of a cylinder of revolution, but other shapes are conceivable.

The invention claimed is:

1. Finger holder for a plucker, said finger holder being intended to be set in rotation about an axis of rotation and comprising:
    a mounting plate having fastening means intended for fastening the mounting plate to a shaft of the plucker,
    a cover which caps a frontal face of the mounting plate and has a plurality of bores, wherein each bore is intended to receive a finger of the plucker, and
    a locking system which is separate from the fastening means and takes up either a locking position, in which it locks the cover on the mounting plate, or an unlocking position, in which it does not lock the cover on the mounting plate,
    wherein the cover has a cap which covers the frontal face of the mounting plate and tabs extending perpendicularly to the cap, and wherein the mounting plate has, for each tab, a recess in which said tab is accommodated.

2. Finger holder according to claim 1, wherein the locking system comprises a slide which slides in a direction of movement in order to pass from the unlocking position to the locking position, wherein the mounting plate has a tunnel that passes through it and extends perpendicularly to the axis of rotation, wherein the cover has two housings, wherein each housing is disposed at one of the ends of the tunnel, and wherein in the locking position, the first end is accommodated in the first housing, the second end is accommodated in the second recess and the central part is accommodated in the tunnel.

3. Finger holder according to claim 2, wherein each housing is incorporated into a tab.

4. Finger holder according to claim 3, wherein the first housing is made up of two peripheral slots made in a first tab, wherein, for each peripheral slot, the first end of the slide has a rib which is accommodated in said peripheral slot, and wherein the second housing is formed of a window made in a second tab.

5. Finger holder according to claim 4, wherein the immobilizing system comprises:
    two flexible arms with a first end and a second end, wherein the first end is integral with the slide, wherein the second end extends in the direction of movement starting from the first end, and the two second ends extend away from one another starting from the first ends and following the direction of movement,
    for each arm, a stop integral with the mounting plate, wherein in the locking position, each second end is constrained against a stop, and
    a pulling means provided to allow the slide to be pulled in an opposite direction to the direction of movement.

6. Finger holder according to claim 5, wherein each second end bears a hook integral with the second end, and in that in the unlocking position, each hook comes into abutment against the stop associated with said second end.

7. Finger holder according to claim 2, wherein the finger holder has a disengageable immobilizing system which immobilizes the slide with respect to the mounting plate in the locking position.

8. Poultry plucker comprising at least one shaft, a motorization system driving each shaft in rotation, for each shaft, a finger holder according to claim 1, wherein the mounting plate is fastened to said shaft by the fastening means, and for each bore, a finger inserted into said bore.

* * * * *